(12) United States Patent
Gerlitz et al.

(10) Patent No.: US 6,433,079 B1
(45) Date of Patent: Aug. 13, 2002

(54) AQUEOUS ANTICORROSION PRIMERS BASED ON POLYVINYLBUTYRAL

(75) Inventors: Martin Gerlitz, Graz; Maximilian Friedl, Gratkorn; Thomas Fischer, Graz; Ernst Supper, Graz; Manfred Krassnitzer, Graz, all of (AT)

(73) Assignee: Solutia Austria GmbH, Werndorf (AU)

( * ) Notice: Subject to any disclaimer, the term of this patent is extended or adjusted under 35 U.S.C. 154(b) by 0 days.

(21) Appl. No.: 09/579,172

(22) Filed: May 25, 2000

(30) Foreign Application Priority Data

May 27, 1999 (AT) ................................................ 940/99

(51) Int. Cl.$^7$ ........................ C08F 16/06; C08F 116/06; C08F 216/06
(52) U.S. Cl. ............................ 525/56; 525/57; 525/58; 525/61; 524/503; 427/388.4; 427/385.5
(58) Field of Search ..................... 427/388.4, 385.5; 524/503; 525/57, 56, 58, 61

(56) References Cited

U.S. PATENT DOCUMENTS

| | | |
|---|---|---|
| 2,509,667 A | 5/1950 | Ballinger |
| 2,532,223 A | 11/1950 | Bromley, Jr. |
| 2,611,755 A | 9/1952 | Bromley, Jr. |
| 2,686,724 A | 8/1954 | Chenicek |
| 3,316,189 A | 4/1967 | Adams |
| 4,999,078 A | 3/1991 | Misra et al. |

FOREIGN PATENT DOCUMENTS

| | | |
|---|---|---|
| DE | 2752054 A1 | 6/1978 |
| DE | 3246605 A1 | 6/1984 |
| DE | 42 01 941 | 8/1993 |
| DE | 4235151 A1 | 4/1994 |
| DE | 19618379 A1 | 11/1997 |
| EP | 0 189 058 | 7/1986 |
| EP | 0638606 A1 | 2/1995 |
| EP | 0741155 A2 | 11/1996 |
| FR | 1 209 906 | 3/1960 |
| GB | 1084820 | 9/1967 |
| JP | 58/026374 | 6/1983 |

*Primary Examiner*—Rachel Gorr
(74) *Attorney, Agent, or Firm*—Frommer Lawrence Haug LLP

(57) ABSTRACT

Water-dilutable polyvinylbutyral dispersions obtainable by a two-stage reaction in the first stage of which at least one tertiary alkanolamine A and at least one diisocyanate B are reacted to the theoretically calculated NCO content and the amounts of components A and B are chosen such that the amount of substance of the diisocyanates B is from 0.8 to 1.3 times the amount of substance of the reactive hydroxyl groups in A and thereafter in the second stage a polyvinylbutyral C dissolved in a solvent which is inert towards isocyanates is reacted with the adduct AB from the first step to form the product ABC until all of the isocyanate groups have undergone complete reaction, the number of hydroxyl groups in C being at least ten times the number of isocyanate groups in the reaction product AB.

18 Claims, No Drawings

AQUEOUS ANTICORROSION PRIMERS BASED ON POLYVINYLBUTYRAL

RELATED APPLICATIONS

This application claims priority to Austrian application No. A 940/99, filed on May 27, 1999, herein incorporated by reference.

BACKGROUND OF THE INVENTION

Aqueous formulations containing polyvinylbutyral (PVB) are known. The majority of such systems are based on the use of ionic emulsifiers (salts of fatty acids, or alkanesulfonates or alkyllaurylsulfonates: U.S. Pat. Nos. 2,686,724, 2,532,223, 2,611,755, 2,509,667, DE-A 27 52 054) or nonionic emulsifier types such as polyvinyl alcohol (JP-A 58/026374), ethoxylated fatty alcohols or reaction products of polyalkylene glycols with polyepoxides (EP-A 0 638 606).

All of these externally emulsified systems, however, have the general disadvantage that the coating materials cannot be pigmented directly owing to the inadequate shear stability of the emulsions. Added to this are the disadvantages occasioned by the type of emulsifier. In the case of high molar mass polyethylene glycol types, there is a rapid decrease in the water resistance of the films and, with the use of low molar mass ionic emulsifiers, it is possible for the emulsifier molecules to migrate in the film and to be leached from the resin system, so causing a continually changing surface composition and changing film properties.

Self-emulsifying aqueous polyvinylbutyral dispersions have also been described: the groups responsible for dilutability in water (which are ionic or nonionic in nature) are introduced into the polymer before the acetalization process.

For the preparation of the polyvinyl alcohol, DE-A 32 46 605 uses a polyethylene grafting base which is subsequently acetalized and which owing to the presence of polyethylene glycol segments leads to water-dilutable end products.

In DE-A 42 35 151, a polyvinyl alcohol copolymer comprising ethylenesulfonate (in salt form) is prepared which is subjected to acetalization and which owing to the presence of sulfonate groups gives water-dilutable products.

Since aqueous polyvinyl alcohol solutions are the starting point in both cases, the resulting dispersions are obtained with a very low solids content. Subsequent blending with plasticizing resins, which are very commonly used to improve film formation, is virtually impossible owing to the reduced compatibility of the modified products. Furthermore, owing to the polyethylene glycol structure or, respectively, to the sulfonate groups, the products are highly sensitive to water and do not satisfy the requirements for industrial use.

Progress was achieved by virtue of the anionically stabilized dispersions described in EP-A 0 741 155; however, their corrosion protection effect is inadequate, since the anionic stabilization by the addition of phosphoric acid, which is usual in conventional anticorrosion primers, is impossible owing to the coagulation of the dispersions which it triggers.

The German Offenlegungsschrift DE-A 196 18 379 describes cationically stabilized epoxy resin dispersions for cataphoretic electrodeposition coating. These dispersions comprise, as a second resin component, a vinyl acetate copolymer, which may also have vinylacetal units.

OBJECT OF THE INVENTION

An object of this invention was therefore to prepare self-emulsifying PVB dispersions which permit addition of phosphoric acid and therefore have the same corrosion protection properties as conventional flash primers.

SUMMARY OF THE INVENTION

It has now been found that by modifying the PVB with tertiary alkanolamines (alone and in combination with cationically stabilized resins) it is possible to obtain water-dilutable primers which satisfy the technical requirements. It is also possible in accordance with the invention in the same way to convert the optimum resin composition for different application purposes (low-, normal- and high-acetalized PVB types, different degrees of polymerization, or combinations with plasticizing resins) into aqueous dispersion form.

DETAILED DESCRIPTION OF THE INVENTION

The invention accordingly provides water-dilutable PVB dispersions obtainable by a two-stage reaction, the first stage of which at least one tertiary alkanolamine A and at least one diisocyanate B are reacted to the theoretically calculated NCO content and the amounts of components A and B are chosen such that the amount of substance of the diisocyanates B is from about 0.8 to about 1.3 times the amount of substance of the reactive hydroxyl groups in A and thereafter in the second stage a polyvinylbutyral C, dissolved in a solvent which is inert towards isocyanates, is reacted with the adduct AB from the first step until all of the isocyanate groups have undergone complete reaction, the number of hydroxyl groups in C being at least ten times the number of isocyanate groups in the reaction product AB, and combining this amine-modified PVB solution, if desired, with one or more compatible plasticizing resins D which is or are likewise water-dilutable by way of tertiary amino groups, the resin mixture containing mass fractions of solids of i) from about 20 to about 100% of modified polyvinylbutyral ABC and ii) from 0 to about 80% of the suitable plasticizing resin D or of a mixture of two or more such suitable plasticizing resins with the proviso that the sum of i) +ii) is 100% and the resulting resin mixture has tertiary amino groups corresponding to an amine number of from about 20 to about 80 mg/g of resin solids.

In the first stage it is essential that the amount of substance of the diisocyanates B is from about 0.8 to about 1.3 times the amount of substance of the reactive hydroxyl groups in A, meaning that the ratio of the amount of substance of the isocyanate groups $n(NCO)$ in component B to the amount of substance of the hydroxyl groups $n(OH)$ in component A is $n(NCO)/n(OH)$=from about 1.6 to about 2.6.

On average, therefore, in each diisocyanate molecule used roughly more than one (to be precise, from 0.8 to 1.3) unreacted isocyanate group remains, the other isocyanate groups having been transformed into urethane groups by reaction with the alkanolamine. It is advantageous to use a slight excess of isocyanate groups in order to compensate for their reaction with any possible impurities. Where monoalkyldialkanolamines are used additionally or exclusively as component A, an excess of isocyanate groups is unnecessary; and in fact, some (up to about 50%, preferably up to 30%) of the diisocyanates B can be replaced by monoisocyanates. The amine number (AN) is defined in accordance with DIN 53 176 as the ratio between the mass $m_{KOH}$ of potassium hydroxide which consumes exactly the same amount of acid for neutralization as the sample under analysis and the mass $m_B$ of this sample (mass of the solid in the sample in the case of solutions or dispersions); its customary unit is "mg/g".

Following neutralization of at least about 50%, preferably more than 70%, of the tertiary amino groups with (in) organic acids, the products of the invention are diluted with deionized water.

Depending on the viscosity of the product, the auxiliary solvent used is distilled off from the dispersion either before neutralization in vacuo or in an azeotrope (under reduced pressure as well if desired).

As component A, use is made of tertiary alkanolamines having one to two OH groups. Preference is given to dialkyl-monoalkanolamines, in which the alkyl radicals can be identical or different and are selected preferably from linear or branched alkyl radicals having 1 to 6 carbon atoms. The parent alkanolamine has 2 to 12 carbon atoms and carries the hydroxyl group and the amino group preferably in positions α and ω. It is also possible to use dialkanolalkylamines having 1 to 6 carbon atoms in the alkyl group and 2 to 12 carbon atoms in the alkanol group, the hydroxyl group likewise being positioned, preferably, to the αω ( amino group. In this case it is also possible to use those alkanol residues which carry more than one hydroxyl group (on different carbon atoms). Examples of such compounds are N-methyldiethanolamine, N,N-dimethylethanolamine or N,N-diethylethanolamine or diethylaminopropanediol. One particularly preferred group are the N,N-dialkylethanolamines.

In order to make it easier to conduct the synthesis, component A can be dissolved in an inert high-boiling solvent which is compatible with water (e.g., N-methylpyrrolidone) and which subsequently also permits improved leveling and improved film formation. Such coalescence agents are commonly used in mass fractions of from about 1 to about 20% (based on the final mass of solid resin). Solvents containing NCO-reactive groups (butyl glycol, glycol ethers, for example) are added, if appropriate, only after the isocyanate reaction has been concluded.

The diisocyanate component B comprises any desired organic diisocyanates having free (i.e., not blocked) isocyanate groups attached to aliphatic, cycloaliphatic, araliphatic and/or aromatic moieties. When aliphatic diisocyanates are used (in which case hexamethylene diisocyanate, trimethylhexamethylene diisocyanate, isophorone diisocyanate and 1,4-diisocyanatocyclohexane are preferred), relatively elastic coatings are obtained; the use of aromatic diisocyanates (tolylene diisocyanate, diphenylmethane diisocyanate and naphthylene diisocyanate are preferred) leads to hard coatings. The selection is made depending on the viscosity of the resulting products and on the profile of requirements for the respective end use. As already stated above, a fraction of the diisocyanates can be replaced by monoisocyanates if alkyldialkanolamines are used as component A.

The reaction of component A with component B is strongly exothermic.

As component C it is possible to use commercially available PVB grades, the properties of the coating being decisively codetermined by the degree of polymerization and the degree of acetalization of the corresponding PVB grade. Examples of customary characteristics are as follows: viscosity (6% strength solution in methanol, 20° C.) from 1 to 200 mPa·s; degree of acetalization from 65 to 90%, preferably from 70 to 85% (calculated as mass fraction of polyvinylacetal); acetate content from 2 to 5%, preferably from 3 to 4% (calculated as mass fraction of polyvinyl acetate); OH or vinyl alcohol group content from 10 to 30%, preferably from 11 to 20% (calculated as mass fraction of polyvinyl alcohol).

Plasticizing resins (component D) used are those resins which are compatible with polyvinylbutyral; that is, do not lead to macroscopic separation. They comprise primarily amino resins, phenolic resins, alkyd resins, and also low-epoxide or epoxide-free resins based on glycidyl ethers of dihydroxy aromatic compounds (especially the so-called phenoxy resins). Particularly suitable, for example, are reaction products of bisphenol A-based liquid resins (®Beckopox EP 140, specific epoxide group content about 5560 mmol/kg, "epoxide equivalent weight" EEW=180 g/mol) with (substituted) monophenols and bisphenols, which are dilutable in water by virtue of the incorporation of dialkylaminoalkylamines (e.g., diethylaminopropylamine) corresponding to an amine number of from 20 to 80 mg/g.

Within the coating formulation, these plasticizing resins may also serve as a vehicle for the optionally added phosphoric acid, which acts as a crosslinker. The phosphoric acid is incorporated preferably in combination with a thickener and together with the plasticizing resin into the PVB dispersion to which the customary coatings additives have been added; alternatively, it can be added after the PVB dispersion and the plasticizing resin have already been mixed. The mass fraction of phosphoric acid in the finished coating material is preferably from about 0.1 to 5%.

Films on the basis of the dispersions of the invention exhibit excellent adhesion to metal, plastics and glass. Primer systems produced with them also exhibit good intercoat adhesion, so that the overcoatability is good as well. Depending on the nature of the plasticizing resin, it is also possible to produce films having excellent hardness, water resistance and corrosion protection effect.

Dispersions of the invention can therefore be used as binders for wash primers or "flash primers", industrial coatings, heat-resistant coating materials (e.g., radiator coatings), packaging coatings, adhesion primers, welding primers, wood flooring varnishes, traffic paints, and adhesives.

In the examples below, n(group) or n(atoms) denotes in each case the amount of substance n of the group or atoms in question with the customary SI unit "mol" (EP=epoxide groups; NH=amine hydrogen atoms; OH=hydroxyl groups).

EXAMPLES

| Plasticizing resin 1 (PR 1): | |
|---|---|
| 913 g | of ® Beckopox EP 140 (EEW = 180 g/mol; specific epoxide group content about 5560 mmol/kg); n(EP) = 5.07 mol |
| 211 g | of bisphenol A; n(OH) = 1.85 mol |
| 188.2 g | of phenol; n(OH) = 2.0 mol |
| 51.1 g | of diethylaminopropylamine; n(H) = 1.0 mol |
| 1363.3 g | |

Epoxy resin, bisphenol and phenol were charged to a reactor and heated under nitrogen at 110 to 120° C. until a clear and homogenous mixture had formed. This mixture was then cooled to 80° C. and the amine was added, with complete cooling, whereupon a strongly exothermic reaction ensued. After the end of the addition, the batch was heated to about 150 to 160° C., utilizing the exothermic heat produced, and held at this temperature for 3 to 4 hours.

The resulting product was suitable for further processing for the preparation of a PVB dispersion. Following complete neutralization of the basic nitrogen groups (AN=41 mg/g) with a volatile organic acid (formic acid) a stable dispersion was formed having a nonvolatiles mass fraction of 40% and a viscosity of 50 mPa·s (DIN EN ISO 3219, 23° C.).

| Plasticizing resin 2 (PR2): | |
|---|---|
| 380 g | of ® Beckopox EP 140;n(EP) = 2.11 mol |
| 388 g | of bisphenol A; n(OH) = 3.40 mol |
| 413 g | of N-methylpyrrolidone |
| 53.5 g | of diethylaminopropylamine; n(H) = 0.82 mol |
| 415 g | of ® Beckopox EP 140; n(EP) = 2.30 mol |
| 1236.5 g | of solid resin; 75% strength solution in NMP |

Epoxy resin and bisphenol were charged to a reactor and heated under nitrogen at 110 to 120° C. until a clear and homogenous mixture had formed, which was diluted with NMP. This mixture was then cooled to 80° C. and the amine was added, with complete cooling, whereupon a strongly exothermic reaction ensued. After the end of the addition, the batch was heated to about 150° C., utilizing the exothermic heat produced, and held at this temperature for about 1 hour. Subsequently, further epoxy resin was added continuously at this temperature over about 5 hours, after which the mixture was held at 160° C. for 2 hours more.

The resulting product was suitable for further processing for the preparation of a PVB dispersion. Following complete neutralization of the basic amino groups (AN=37 mg/g) with a volatile organic (acetic acid) a stable dispersion was formed having a nonvolatiles mass fraction of 35% and a viscosity of less than 50 mPa·s (DIN EN ISO 3219, 23° C.).

| Plasticizing resin 3 (PR 3): | |
|---|---|
| 1358 g | of ® Beckopox EP 140; n(EP) = 7.54 mol |
| 121 g | of bisphenol A; n(OH) = 1.06 mol |
| 335 g | of phenol; n(OH) = 3.56 mol |
| 129 g | of dimethylaminopropylamine; n(H) = 2.52 mol |
| 1943 g | |

Epoxy resin, bisphenol and phenol were charged to a reactor and heated under nitrogen at 110 to 120° C. until a clear and homogenous mixture had formed. This mixture was then cooled to 80° C. and the amine was added, with complete cooling, whereupon a strongly exothermic reaction ensued. After the end of the addition, the batch was heated to about 150 to 160° C., utilizing the exothermic heat produced, and held at this temperature for 3 to 4 hours. The resulting product was suitable for further processing for the preparation of a PVB dispersion. Following neutralization of 70% of the basic nitrogen groups (AN=73 mg/g) with a volatile organic acid (acetic acid) and addition of NMP (10% of the mass of the solid resin), a stable dispersion was formed having a nonvolatiles mass fraction of about 35% and a viscosity of 50 mPa·s (DIN EN ISO 3219, 23° C.).
PVB dispersion 1 (PVB 1)

255 g of ®Mowital B 20 H (polyvinylbutyral with a degree of acetalization of about 76%, an acetate content of about 3% and an alcohol group content of about 20%; viscosity of a 10% strength ethanolic solution at 20° C. about 23 mPa·s) were dissolved in 820 g of xylene and the solution was conditioned to 80° C. To this solution there were added rapidly 53 g of a 50% strength solution of the isocyanate-functional product of reaction of 174 g of tolylene diisocyanate (TDI) with 89 g of dimethylethanolamine in xylene (carried out in accordance with Patents AT-B 342 169, AT-B 346 989, AT-B 362 479) and the batch was held at 100° C. for 1 hour (amine number: 27.5 mg/g; nonvolatiles mass fraction about 25%).

180 g of the plasticizing resin 3 (PR 3) and 23 g of NMP were added to 205 g of this precursor, and the mixture was homogenized at 100° C. for 1 hour. The PVB mass fraction in the solids fraction of the resin composition was about 20%. The amine number was about 60 mg/g; the mass ratio of solvent (NMP) and solid resin was about 10%. Following neutralization of 90% of the basic nitrogen groups with formic acid and dilution with water, the xylene auxiliary solvent used was distilled off completely as an azeotrope. This gave a stable dispersion having a nonvolatiles mass fraction of about 35% and a viscosity of less than 50 mPa·s at 23° C.
PVB dispersion 2 (PVB 2)

255 g of ®Mowital B 20 H were dissolved in 840 g of xylene and the solution was conditioned to 80° C. To this solution there were added rapidly 76 g of a 50% strength solution of the isocyanate-functional product of reaction of 174 g of TDI with 117 p of diethylethanolamine in xylene (carried out in accordance with Patents AT-B 342 169, AT-B 346 989, AT-B 362 479) and the batch was held at 100° C. for 1 hour (amine number: 25 mg/g; nonvolatiles mass fraction about 25%).

200 g of the plasticizing resin 2 (PR 2, nonvolatiles mass fraction about 75%) were added to 400 g of this precursor, and the mixture was homogenized at 100° C. for 1 hour. The PVB mass fraction in the solid resin composition was 34.8%. The amine number was 32 mg/g; the mass ratio of NMP to solid resin was 20%. Following neutralization of all of the basic amino groups with formic acid and dilution with water, the xylene auxiliary solvent used was distilled off completely as an azeotrope.

This gave a stable dispersion having a nonvolatiles mass fraction of about 29% and a viscosity of less than 50 mPa·s at 23° C.
PVB dispersion 3 (PVB 3)

255 g of ®Mowital B 20 H were dissolved in 850 g of xylene and the solution was conditioned to 80° C. To this solution there were added rapidly 84 g of a 50% strength solution of the isocyanate-functional product of reaction of 174 g of TDI with 89 g of dimethylethanolamine in xylene (carried out in accordance with Patents AT-B 342 169, AT-B 346 989, AT-B 362 479) and the batch was held at 100° C. for 1 hour (amine number: 30 mg/g; nonvolatiles mass fraction about 25%).

100 g of the plasticizing resin 1 (PR 1) and 20 g of NMP were added to 400 g of this precursor, and the mixture was homogenized at 100° C. for 1 hour. The PVB mass fraction in the solid resin was about 43%; the amine number was 36 mg/g; the mass ratio of NMP solvent to solid resin was about 20%. Following neutralization of all of the basic nitrogen groups with formic acid and dilution with water, the xylene auxiliary solvent used was distilled off completely as an azeotrope. This gave a stable dispersion having a nonvolatiles mass fraction of about 23% and a viscosity of less than 50 mPa·s at 23° C.

Comparative Dispersion 4 (PVB 4)
(Use of a Non-amine-modified PVB Component)

255 g of ®Mowital B 20 H were dissolved in 765 g of xylene and the solution was conditioned to 80° C. (nonvolatiles mass fraction about 25%). 50 g of the plasticizing resin 3 (PR 3) and 25 g of NMP were added to 400 g of this precursor, and the mixture was homogenized at 100° C. for 1 hour. The PVB mass fraction in the solid resin was about 40%; the amine number was 43 mg/g; the mass ratio of NMP solvent to solid resin was about 20%.

Following neutralization of all of the basic nitrogen groups with formic acid and dilution with water, the xylene auxiliary solvent used was distilled off completely as an azeotrope. As early as during the distillation phase, the product became inhomogeneous, and phase separation occurred following dilution with water.

Coating material 1:

Paste: (amounts in g/100 g)

| | |
|---|---|
| 77.0 | of the inventive dispersion PVB 3 |
| 7.6 | of ® Additol VXW 6208 (dispersant) |
| 2.5 | of ® Acrysol RM8/supply form (rheology additive) premixed with |
| 7.7 | of deionized water |
| 3.8 | butyl diglycol |
| 1.4 | of ® Additol XW 376 (defoamer) |
| 100.0 | |

Making up:

| | | |
|---|---|---|
| to | 68.0 g | of the paste there were admixed: |
| | 21.0 g | of plasticizing resin 1 (PR 1) |
| | 11.0 g | of curing agent mixture about 5% |
| | 100.0 g | of coating material |

(Curing agent mixture:

| | |
|---|---|
| 5.0 g | of 7 Acrysol RM8/supply form |
| 88.7 g | of deionized water |
| 6.3 g | of 75% strength phosphoric acid |
| 100.0 g | of curing agent mixture) |

Preparation: The constituents of the paste were mixed in the stated order and homogenized thoroughly using a dissolver. At the making-up stage, the paste was introduced initially and the plasticizing resin and premixed curing agent were added. At about 20° C., the coating material had a processing life of about 5 hours.

Coating Material 2

Prepared as for coating material 1 but without the addition of curing agent mixture.

Coating material 3:

Conventional flash primer using epoxy resin

| | |
|---|---|
| 16.9 g | of ® Beckopox EM 460/60X |
| 50.5 g | of ® Mowital B 30H 20% strength* |
| 4.0 g | of ® Wacker HDK-H 15-paste 10% strength** |
| 24.6 g | of diluent*** |
| 4.0 g | of 1:3 85% strength phosphoric acid/butanol |
| 100.0 g | |

*Mowital B 30H solution:
20 g of Mowital B 30H (degree of acetalization about 77%; otherwise as grade 20H; viscosity of a 10% strength ethanolic solution at Coating material 3:

Conventional flash primer using epoxy resin
20° C. about 45 mPa•s)

| | |
|---|---|
| 20 g | of butanol |
| 20 g | of methoxypropanol |
| 40 g | of xylene |
| 100 g | of Mowital solution |

**HDK-H 15-paste:

| | |
|---|---|
| 85 g | of xylene |
| 10 g | of ® Wacker HDK-H 15 (silica thickener) |
| 5 g | of ® Additol XL 270 |
| 100 g | of paste 10% strength |

***Diluent:

| | |
|---|---|
| 30 g | of butanol |
| 30 g | of methoxypropanol |
| 40 g | of xylene |
| 100 g | of solvent mixture |

Coating material 4:

Binder according to Example 1)
of the Application EP-A 0 741 155

| | |
|---|---|
| 77.0 g | of dispersion according to Example 1 of EP-A 0 741 155 |
| 7.6 g | of ® Additol VXW 6208 (dispersant) |
| 2.5 g | of ® Acrysol RM8/supply form (rheology additive) premixed with |
| 7.7 g | of deionized water |
| 3.8 g | of butyl diglycol |
| 1.4 g | of 7 Additol XW 376 (defoamer) |
| 100.0 g | of coating material |

Coating Material Comparison

The coating materials were applied to galvanized sheet iron.

| | Coat. mat. 1 | Coat. mat. 2 | Coat. mat. 3 | Coat. mat. 4 |
|---|---|---|---|---|
| Adhesion after exposure | + | 0 | 0+ | 0 |
| Water resistance | + | – | + | – |
| Corrosion protection | + | – | 0+ | – |
| Build with aqueous topcoat | + | 0 | + | – |

The key to the evaluations is as follows:
+ good
0+ satisfactory
0 adequate
– deficient "Coat. mat." means paint ("coating material")

With the inventive coating material 1, good results are obtained for all of the properties investigated, in some cases even exceeding the properties of wash primer compositions based on phenoxy resins (coating material 3). Without the addition of curing agent (coating material 2), the results obtained are unsatisfactory, similarly to those obtained in the case of an anionically stabilized PVB (coating material 4).

The above description of the invention is intended to be illustrative and not limiting. Various changes or modifications in the embodiments described herein may occur to those skilled in the art. These changes may be made without departing from the scope and sprit of the invention.

What is claimed is:

1. A water-dilutable polyvinylbutyral dispersion obtained by a two-stage reaction comprising:
   1. reacting
      at least one tertiary alkanolamine A and
      at least one diisocyanate B
      to the theoretically calculated NCO content
      wherein the amounts of components A and B are chosen such that the amount of substance of the diisocyanates B is from about 0.8 to about 1.3 times the amount of substance of the reactive hydroxyl groups in A.
   2. reacting until all of the isocyanate groups have undergone complete reaction
      a polyvinylbutyral C in partial solution in a solvent which is inert towards isocyanates with
      the adduct AB from the first step
   to form the product ABC wherein the number of hydroxyl groups in C being at least about ten times the number of isocyanate groups in the reaction product AB, and
   combining this solution of the amine-modified polyvinylbutyral ABC, optionally, with one or more compatible plasticizing resins D which is or are likewise water-dilutable by way of tertiary amino groups,
   the resin mixture containing mass fractions of solids of (based in each case on resin solids)
      i) from about 20 to 100% of modified polyvinylbutyral ABC and
      ii) from 0 to about 80% of the suitable plasticizing resin D or of a mixture of two or more such suitable plasticizing resins
   with the proviso that the sum of i)+ii) is 100% and the resulting resin mixture has tertiary amino groups corresponding to an amine number of from about 20 to about 80 mg/g resin solids and, following neutraliation, by diluting the product with deionized water, at least about 50% of the tertiary amino groups of the amine-modified polyvinylbutyrals ABC with (in)organic acids.

2. A water-dilutable polyvinylbutyral dispersion as claimed in claim 1, wherein component A is a tertiary alkanolamine having one to two OH groups.

3. A water-dilutable polvinylbutyral dispersion as claimed in claim 1, wherein component A is a dialkyl-monoalkanolamine in which the alkyl radicals are identical or different and are selected from linear or branched $C_1$–$C_6$ alkyl radicals.

4. A water-dilutable polyvinylbutyral dispersion as claimed in claim 1, wherein component A is derived from an alkanolamine having 2 to 12 carbon atoms which carries the hydroxyl group and the amino group in positions α and ω, respectively.

5. A water-dilutable polyvinylbutyral dispersion as claimed in claim 1, wherein component A is a dialkanolalkylamine having 1 to 6 carbon atoms in the alkyl group and 2 to 12 carbon atoms in the alkanol group are A, the hydroxyl group being positioned ω to the amino group, and wherein, optionally up to about 50% of the diisocyanates B are replaced by monoisocyanates.

6. A water-dilutable polyvinylbutyral dispersion as claimed in claim 1, wherein component B is an aromatic diisocyanate.

7. A water-dilutable polyvinylbutyral dispersion as claimed in claim 1, wherein polyvinylbutyrals having a degree of acetalization of from 65 to 90% (calculated as mass fraction of polyvinylacetal), an acetate content of from 2 to 5% (calculated as mass fraction of polyvinyl acetate) and an alcohol group content of from 10 to 30% (calculated as mass fraction of polyvinyl alcohol) are used as component C.

8. A water-dilutable polyvinylbutyral dispersion as claimed in claim 2, wherein the tertiaryalkanolamine is N-methyldiethanolamine, N,N-dimethylethanolamine, or diethylaminopropanediol.

9. A water-dilutable polyvinylbutyral dispersion as claimed in claim 1, wherein component B is hexamethylene diisocyanate, trimethylhexamethylene diisocyanate, isophorone diiocyanate, 1,4-diisocyanatocyclohexane, tolylene diisocyanate, diphenylmethane diisocyanate or naphthylene diisocyanate.

10. A water-dilutable polyvinylbutyral dispersion as claimed in claim 1, which further comprises a plasticizing resin D selected from phenoxy resins, amino resins, alkyd resins and phenolic resins.

11. A coating material comprising a water-dilutable polyvinylbutyral dispersion as claimed in claim 1, which material comprises a phosphoric acid mass fraction of from about 0.1 to about 5%.

12. A water-dilutable polyvinylbutyral dispersion obtained by a two-stage reaction comprising:
   1. reacting
      at least one tertiary alkanolamine A and
      at least one diisocyanate B
      to the theoretically calculated NCO content
      wherein the amounts of components A and B are chosen such that the amount of substance of the diisocyanates B is from 0.8 to 1.3 times the amount of substance of the reactive hydroxyl groups in A
   2. reacting until all of the isocyanate groups have undergone a complete reaction
      a polyvinylbutyral C in partial solution in a solvent which is inert towards isocyanates with
      the adduct AB from the first step
   to form the product ABC wherein the number of hydroxyl groups in C being at least ten times the number of isocyanate groups in the reaction product AB, and
   combining this solution of the amine-modified polyvinylbutyral ABC, optionally, with one or more compatible plasticizing resins D which is or are likewise water dilutable by way of tertiary amino groups,
   the resin mixture containing mass fractions of solids of (based in each case on resin solids)
      i) from 20 to 100% of modified polyvinylbutyral ABC and
      ii) from 0 to 80% of the suitable plasticizing resin D or of a mixture of two or more such suitable plasticizing resins
   with the proviso that the sum of i)+ii) is 100% and the resulting resin mixture has tertiary amino groups corresponding to an amine number of from 20 to 80 mg/g resin solids and, following neutralization, by diluting the product with deionized water, of at least 50% the tertiary amino groups of the amine-modified polyvinylbutyrals ABC with (in)organic acids.

13. A process for preparing a water-dilutable polyvinylbutyral dispersion which comprises first, reacting tertiary alkanolamines A with diisocyanates B in amounts such that the amount of substance of the isocyanates B is from about 0.8 to about 1.3 times the amount of substance of the hydroxyl groups in A; and, second, reacting the adduct AB from the first stage with a hydroxyl-containing polyvinylbutyral C, the amount of substance of the hydroxyl groups in C being at least about ten times the amount of substance of the isocyanate groups, and subsequently neutralizer at least about 50% of the amino groups of the reaction product ABC from the second stage are by adding acids.

14. A primer which comprises a binder comprising a water-dilutable polyvinylbutyral dispersion as claimed in claim 1.

15. An adhesion promoter which comprises a water-dilutable polyvinylbutyral dispersion as claimed in claim 1.

16. A corrosion protection composition for metal substitutes which comprises a water-dilutable polyvinylbutyral dispersion as claimed in claim 1.

17. A method for promotion intercoat adhesion on multi-layer subtrate which comprises applying a water-dilutable polyvinyl butyral dispersion as claimed in claim 1.

18. A method for preventing temporary corrasion of a metallic substrate which comprises applying to said substrate a corrosion protection composition according to claim 1.

* * * * *